(12) United States Patent
Watanabe et al.

(10) Patent No.: US 6,692,866 B2
(45) Date of Patent: Feb. 17, 2004

(54) LAMINATION TYPE SECONDARY BATTERY

(75) Inventors: Hideto Watanabe, Utsunomiya (JP);
Katsuichi Mogami, Utsunomiya (JP);
Eiko Motegi, Tokyo (JP)

(73) Assignees: NEC Mobile Energy Corporation,
Utsunomiya (JP); NEC Corporation,
Tokyo (JP)

( * ) Notice: Subject to any disclaimer, the term of this patent is extended or adjusted under 35 U.S.C. 154(b) by 157 days.

(21) Appl. No.: 10/080,698

(22) Filed: Feb. 25, 2002

(65) Prior Publication Data

US 2002/0119367 A1 Aug. 29, 2002

(30) Foreign Application Priority Data

Feb. 23, 2001 (JP) ........................................ 2001-048986

(51) Int. Cl.[7] ................................................. H01M 2/14
(52) U.S. Cl. ...................... 429/129; 429/128; 429/131; 429/211
(58) Field of Search ................................ 429/129, 128, 429/131, 136, 211, 247

(56) References Cited

U.S. PATENT DOCUMENTS 4,948,685 A * 8/1990 Ohsawa et al. ............. 429/213

2002/0051905 A1 * 5/2002 Kitoh et al. ................. 429/176

FOREIGN PATENT DOCUMENTS

| JP | 8-250102 | 9/1996 |
| JP | 10-64506 | 3/1998 |
| JP | 2000-260478 | 9/2000 |
| JP | 2000-315489 | 11/2000 |

* cited by examiner

*Primary Examiner*—Patrick Ryan
*Assistant Examiner*—R Alejandro
(74) *Attorney, Agent, or Firm*—Westerman, Hattori, Daniels & Adrian, LLP

(57) ABSTRACT

The present invention provides a lamination type secondary battery, in which accurate positioning can be performed for positive electrodes and negative electrodes arranged face-to-face to each other. The invention provides a lamination type secondary battery, which comprises positive electrodes and negative electrodes having different surface areas, said positive electrodes and said negative electrodes being laminated on each other with a separator between them, each of the electrodes having smaller surface area is arranged at the center with equal spacing from outer periphery of a separator main body and is covered with the separator main body, and outer periphery of each of the electrodes having larger surface area is equal in size with outer periphery of the separator main body to cover the electrode having smaller surface area.

18 Claims, 10 Drawing Sheets

(A)

(B)

(A)

(B)

(A)

(B)

(C)

(A)

(B)

LAMINATION TYPE SECONDARY BATTERY

BACKGROUND OF THE INVENTION

The present invention relates to a lamination type secondary battery, and in particular, to a lamination type secondary battery, which comprises a plurality of positive electrodes and negative electrodes laminated on each other with a separator between them, and current collecting tabs of the positive electrodes are connected in parallel to current collecting tabs of the negative electrodes.

Various types of secondary batteries are known. As a battery having high energy density, efforts are being made on practical utilization of nonaqueous electrolyte battery such as lithium ion battery.

As the nonaqueous electrolyte battery, two types of batteries are known: a cylindrical type battery, which comprises a cylindrical battery element accommodated in a battery case, and the cylindrical battery element being produced by winding up positive and negative electrodes each in band-like shape with a separator between them. There is also a rectangular type battery, which comprises a battery element produced by winding up the electrodes as described above, the battery element is then molded in flat shape and is accommodated in a rectangular battery case. These are now widely used as power source for portable type devices such as personal computer, portable telephone, etc.

Besides the battery using the positive electrodes and the negative electrodes in band-like shape, a lamination type secondary battery is known, which comprises a plurality of positive electrodes and negative electrodes in planar shape, the positive electrodes and the negative electrodes being laminated via a separator, and current collecting tabs bonded to each of the electrodes are connected in parallel.

In the secondary battery comprising wound-up type battery element using the positive electrodes and the negative electrodes in band-like shape, the current collecting tabs are bonded to the negative electrodes and the positive electrodes, and these are laminated in the order of separator—negative electrode—separator—positive electrode, and the battery element can be produced. This contributes to easier manufacture of the battery element, while there have been problems in that these components may be bent or crooked during winding operation, or that the battery active material layer tends to be thicker on the portion where radius of curvature is smaller, or that electric current is often concentrated at a certain point. Also, in the wound-type battery element, a force is applied in a direction opposite to the winding direction, and it is necessary to arrange so that the wound-type battery element is not unwound. Further, in the wound-type battery element, when a plurality of current collecting tabs are mounted on the electrodes to charge or discharge large electric current, the shape of the wound-type element may be distorted, or problems may occur in the connection between the current collecting tab and the terminal for external connection.

In contrast, in the lamination type secondary battery, which comprises a plurality of electrodes in planar shape laminated on each other, deformation caused by volume change of the active material during charging or discharging takes place only in laminating direction. Thus, the influence of the volume change on the battery is low. Also, it is easy to accurately connect the current collecting tabs mounted on the electrodes of the battery element. Therefore, it can be applied in extensive range from small-size battery with smaller current capacity to large-size battery, in which charging and discharging of large electric current can be achieved. If the current collecting tab having larger conductive area is used, charging and discharging of larger electric current can be easily performed. In this sense, the lamination type secondary battery seems to be very promising as a structure for large-size battery.

FIG. 10 is a perspective view to explain a conventional lamination type secondary battery.

A lamination type secondary battery 30 comprises a plurality of positive electrodes 31 and negative electrodes 32, and these electrodes are arranged at face-to-face position via a separator 33 between them. Positive electrode current collecting tabs 34 and negative electrode current collecting tabs 35 bonded to the positive electrodes and the negative electrodes respectively are connected in parallel. Then, the tabs are conductively connected to a positive electrode terminal 37 and a negative electrode terminal 38 mounted on a lid 36 of the battery. Then, these are accommodated in a battery case 39, and the opening between the battery case 39 and the lid 36 is sealed by means such as laser welding.

However, for the purpose of laminating a plurality of positive electrodes and negative electrodes in planar shape with a separator between them in the lamination type secondary battery, it is essential to laminate and assemble these electrodes only after accurate positioning so that position of each of the electrode plates is not deviated from each other. This means that much labor and time are required in the positioning and assembling processes of the electrodes.

Also, in case of lithium ion battery, the negative electrodes having larger surface areas than the positive electrodes must be used to prevent deposition of metal lithium on the surface of the negative electrode, which is caused by intensive concentration of electric current during charging operation. It is also indispensable to prevent the deposition of metal lithium due to intensive concentration of electric current on the ends of the negative electrodes. This can be accomplished by providing the active material of the negative electrode to all portions facing to the positive electrode.

Therefore, in the lithium ion battery, it is very important to perform accurate positioning and to laminate the positive electrodes and the negative electrodes different in size on each other. Deviation in positions of the electrodes not only adversely affects performance characteristics of the battery but also it may result in unfavorable condition such as short-circuiting with the positive electrode due to the deposition of metal lithium.

Further, in the lamination type secondary battery, current collecting tabs mounted on the positive electrodes and the negative electrodes are bonded to a conductive connection terminal mounted on the battery lid. Then, the battery lid is engaged in the opening of the battery case. In this connection, the current collecting tab must be longer in length compared with the distance between the electrode and the conductive connection terminal when the battery lid is engaged in the opening. When a longer current collecting tab is used, short-circuiting may occur due to the contact of the current collecting tabs with different polarities with each other or due to contact between the current collecting tab and the electrode having different polarities. In particular, in the battery used as a mobile power source, there is high possibility that short-circuiting may occur due to vibration or shock from outside.

To prevent the short-circuiting with the current collecting tab, a method may be adopted to cover the current collecting tab with an insulating material. This leads to the increase in the number of assembling processes to cover the current collecting tab with the insulating material. Also, this causes relative decrease of the quantity of the battery active material in the battery case. For a battery with high energy density, there have been many problems in taking these measures.

It is an object of the present invention to provide a lamination type secondary battery such as a lithium ion battery, which comprises positive electrodes and negative electrodes different in size, these electrodes being laminated via a separator, and by which it is possible to perform accurate positioning of the positive electrode and the negative electrodes and to provide a battery, which has high capacity density, and there is no possibility of short-circuiting in the battery, which is easier to assemble.

SUMMARY OF THE INVENTION

The present invention provides a lamination type secondary battery, which comprises positive electrodes and negative electrodes having different surface areas, said positive electrodes and said negative electrodes being laminated face-to-face with a separator therebetween, each of the electrodes having smaller surface area is covered with a separator main body and arranged at the center and positioned with equal spacing from outer periphery of the separator main body, and outer periphery of the electrode having larger surface area has a size equal to the size of outer periphery of the separator main body to cover the electrode having smaller surface area.

Further, the present invention provides the lamination type secondary battery as described above, wherein a current collecting tab provided on the electrode having smaller surface area is covered with a protective member integrally formed with the separator main body.

Also, the present invention provides the lamination type secondary battery as described above, wherein when the electrode having smaller surface area is projected perpendicularly to the electrode having larger surface area, the entire portion of the projected area is within the electrode having larger surface area.

Further, the present invention provides the lamination type secondary battery as described above, wherein when the electrode having smaller surface area is projected perpendicularly to the opposing electrode having large surface area, an area outside the projected portion is positioned face-to-face to the current collecting tab mounted on the electrode having smaller surface area and is provided with a notched portion larger than the width of the current collecting tab.

Also, the present invention provides the lamination type secondary battery as described above, wherein at least a part of the separator positioned in an area outside the electrode having smaller surface area is thermally fused.

Further, the present invention provides the lamination type secondary battery as described above, wherein the electrode having smaller surface area is designed in polygonal shape, and each corner of the electrode is rounded.

Also, the present invention provides the lamination type secondary battery as described above, wherein external form of the electrode is designed with curved surface.

DESCRIPTION OF THE PREFERRED EMBODIMENT

In a lamination type secondary battery, which comprises positive electrodes and negative electrodes having different surface areas and laminated on each other with a separator between them, if size of outer peripheral portion of the electrode with smaller surface area covered by the separator is equalized with size of outer peripheral portion of the electrode having larger surface area, it is possible to perform accurate positioning when the battery is assembled. Also, it is much easier to perform such positioning. The present invention provides a lamination type secondary battery with such features.

Further, when a conductive tab mounted on the electrode with smaller surface area is covered with a portion which is integrated with a separator main body extended from the separator main body or when a notched portion is provided on a specific part of the electrode having larger surface area, it is possible to prevent short-circuiting between the current collecting tab mounted on the electrode having smaller surface area and the opposing electrode. As a result, it is possible to provide a lamination type secondary battery with high reliability.

Referring to the attached drawings, description will be given on the present invention. In the description given below, it is supposed that the electrode having larger surface area is a positive electrode.

Figure 1:
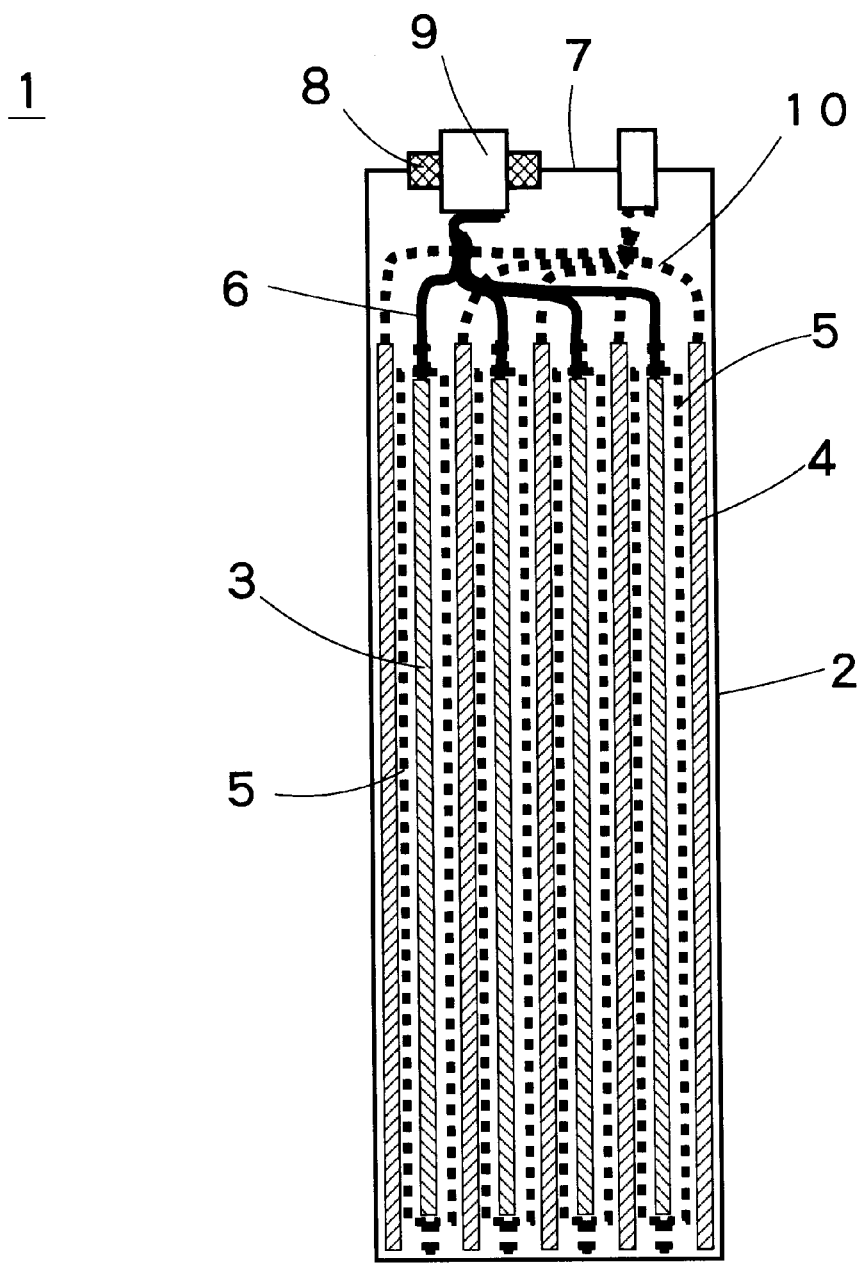
FIG. 1 is a cross-sectional view to explain a lamination type secondary battery according to the present invention.

FIG. 1 is a cross-sectional view to explain a lamination type secondary battery according to the present invention.

A lamination type secondary battery 1 of the present invention comprises a plurality of positive electrodes 3 and negative electrodes 4 arranged face-to-face to each other in a battery case 2.

Each of the positive electrodes 3 covered with a separator 5 is smaller in size compared with each of the negative electrodes 4, and the separator is present only on outer peripheral portion of the positive electrode 3. The center of the positive electrode is aligned with the center of the negative electrode. The outer peripheral portion of each of the negative electrodes 4 is equal in size to outer peripheral portion of the separator.

In this respect, the positive electrodes 3 covered with a separator and the negative electrodes 4 can be laminated on each other as they are arranged under accurate positioning.

A plurality of positive electrode current collecting tabs 6 bonded to the positive electrodes 3 are overlapped on each other and combined together. Then, the tabs are connected to a positive electrode terminal 9, which is mounted on a casing 7 via insulating members. The tabs are connected to the part of the positive terminal inside the casing, and conductive connection is completed.

Similarly, a plurality of negative electrode current collecting tabs 10 bonded to each of the negative electrodes 4 respectively are overlapped on each other and combined together. The tabs 10 are conductively connected to a negative terminal 11 mounted on the casing 7. The tabs are connected to the part of the negative terminal 11 inside the battery case.

As described above, in the lamination type secondary battery of the present invention, the positive electrodes and the negative electrodes being different in size are arranged accurately at face-to-face position and at predetermined position, and these can be laminated on each other.

Figure 2:
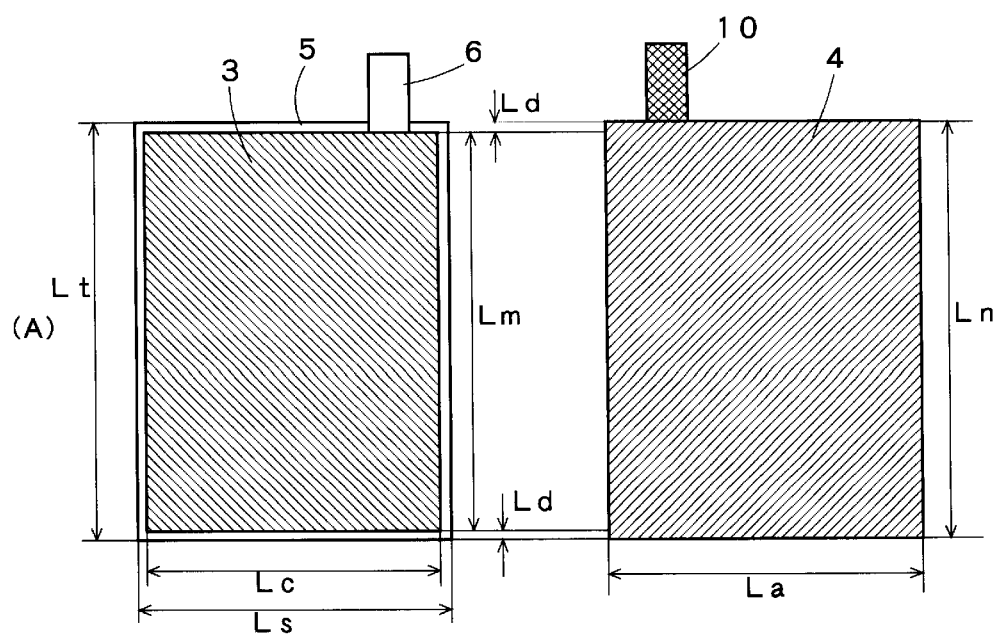
FIG. 2 represents plan views of an example of a positive electrode and a negative electrode of the battery according to the present invention.
Figure 2:
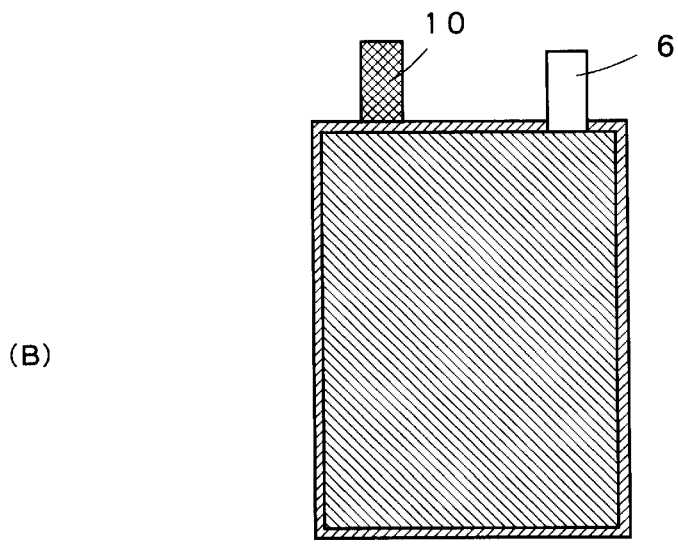

FIG. 2 is a plan view of an example of the positive electrode and the negative electrode according to the present invention. As shown in FIG. 2(A), the positive electrode having smaller surface area than the negative electrode 4 is covered with the separator 5.

There are the following parameters:

Lc: Length in lateral direction of the positive electrode

Lm: Length in longitudinal (vertical) direction of the positive electrode

La: Length in lateral direction of the negative electrode

Ln: Length in longitudinal (vertical) direction of the negative electrode

Ls: Length in lateral direction of the separator

Lt: Length in vertical direction of the separator

Ld: Width of the separator positioned on outer periphery of the positive electrode The relation of these parameters is given by the following equations:

$$Ln = Lm + 2Ld = Lt$$

$$Ls = La$$

FIG. 2(B) is a drawing to explain a condition where the positive electrode covered with the separator and the negative electrode are laminated on each other. Positioning is performed by aligning at least one side of the positive electrode covered with the separator with one side of the negative electrode. The center of the positive electrode is aligned with the center of the negative electrode. Thus, these electrodes can be laminated on each other so that the negative electrode is always present on the projected plane of the positive electrode. As described above, the positive electrode and the negative electrode are laminated on each other with accurate positioning. As a result, the positive electrode current collecting tab 6 and the negative electrode current collecting tab 10 mounted on each of the electrodes respectively are not deviated from each other in positioning, and these can be accurately overlapped on each other and combined together.

Figure 3:
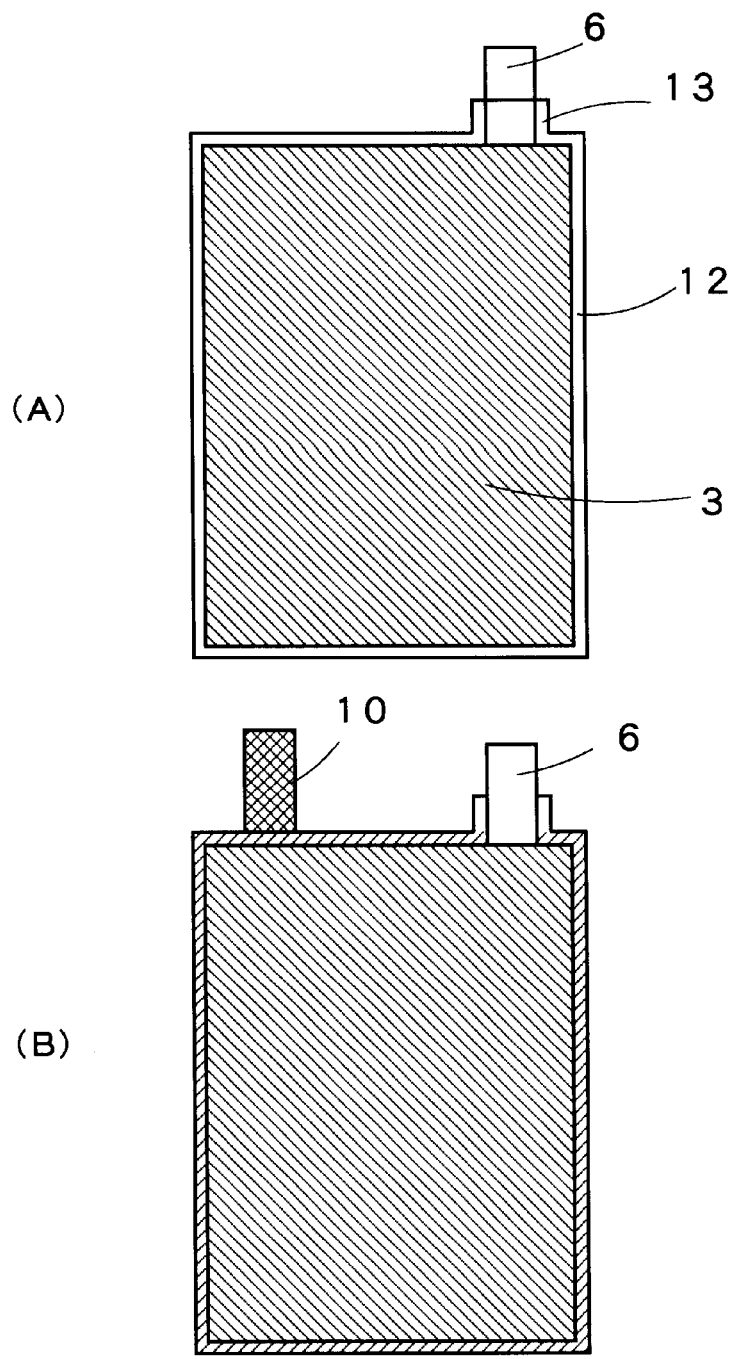
FIG. 3 represents drawings to explain another embodiment of the present invention.

FIG. 3 represents drawings to explain another embodiment of the present invention.

In the positive electrode 3 shown in FIG. 3(A), the positive electrode current collecting tab 6 is covered with a protective member 13, which is integrated with a separator main body 12.

The positive electrode current collecting tab 6 is covered with the protective member 13. As a result, as shown in FIG. 3(B), when the positive electrode 3 is laminated with the negative electrode 4, it is possible to eliminate the possibility of short-circuiting between the positive electrode current collecting tab 6 and the end of the negative electrode 4, which is larger in size than the end of the positive electrode.

In the explanation given in connection with FIG. 3, description has been given on an example where the positive electrode current collecting tab 6 and the negative electrode current collecting tab 10 are provided on the same end surface. However, it may be designed in such manner that the positive electrode current collecting tab and the negative electrode current collecting tab are directed in opposite directions or that the positive electrode current collecting tab and the negative electrode current collecting tab are arranged on end surfaces, which cross each other at an angle of 90°.

In the present invention, the separator main body is positioned between the positive electrode and the negative electrode as shown in FIG. 3. The separator main body comprises two portions, i.e. a portion to fulfill the function to define or distinguish the two different electrodes, i.e. an initial function of the separator, and a portion to protect the current collecting tab. In the portion having no protective function, the separator main body has simply the same meaning as the separator main body.

Figure 4:
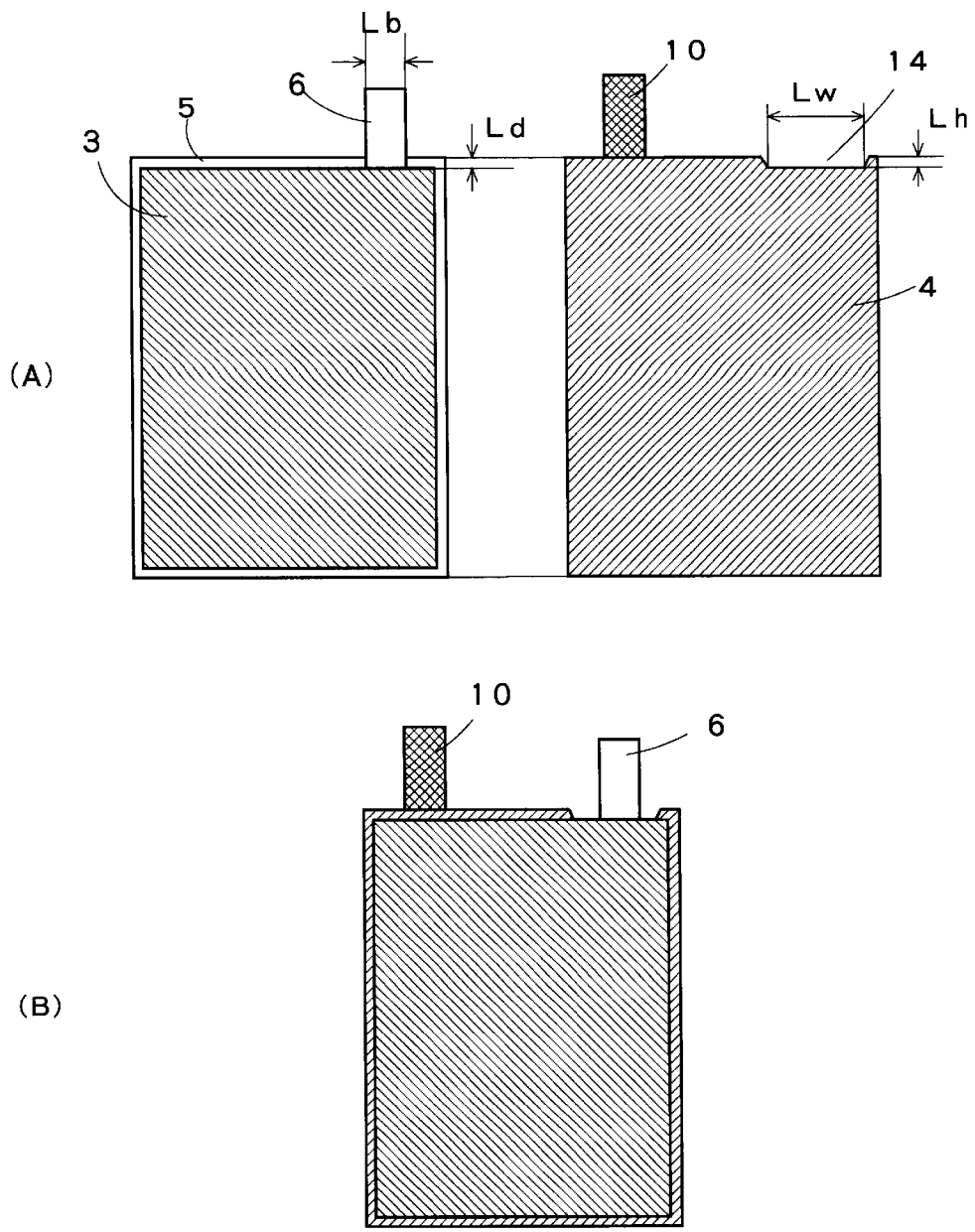
FIG. 4 represents drawings to explain still another embodiment of the present invention.

FIG. 4 represents drawings to explain still another embodiment of the present invention.

The positive electrode 3 covered with the separator 5 and the negative electrode 4 as shown in FIG. 4(A) are arranged at face-to-face position as shown in FIG. 4(B) and are laminated on each other.

The negative electrode 4 positioned face-to-face to the positive electrode current collecting tab 6 has a notched portion 14 on and around the position facing to the positive electrode current collecting tab 6.

In FIG. 4, there are the following parameters:

Lw: Length in lateral direction of the notched portion of the negative electrode Lh: Length in longitudinal direction of the notched portion of the negative electrode Lb: Width of the positive electrode tab Ld: Width of the separator positioned on outer periphery of the positive electrode The relation of these parameters is given by:

$$Lw > Lb \text{ and } Lh < Ld$$

This satisfies the relationship that the negative electrode is larger in size than the opposing positive electrode.

The notched portion may be designed in any shape, while it is preferably designed in trapezoidal shape with the width being widened toward the end.

As describe above, the notched portion 14 is provided on the negative electrode positioned face-to-face to the positive electrode tab, and this contributes to the elimination of the possibility of short-circuiting between the positive electrode current collecting tab and the negative electrode.

Figure 5:
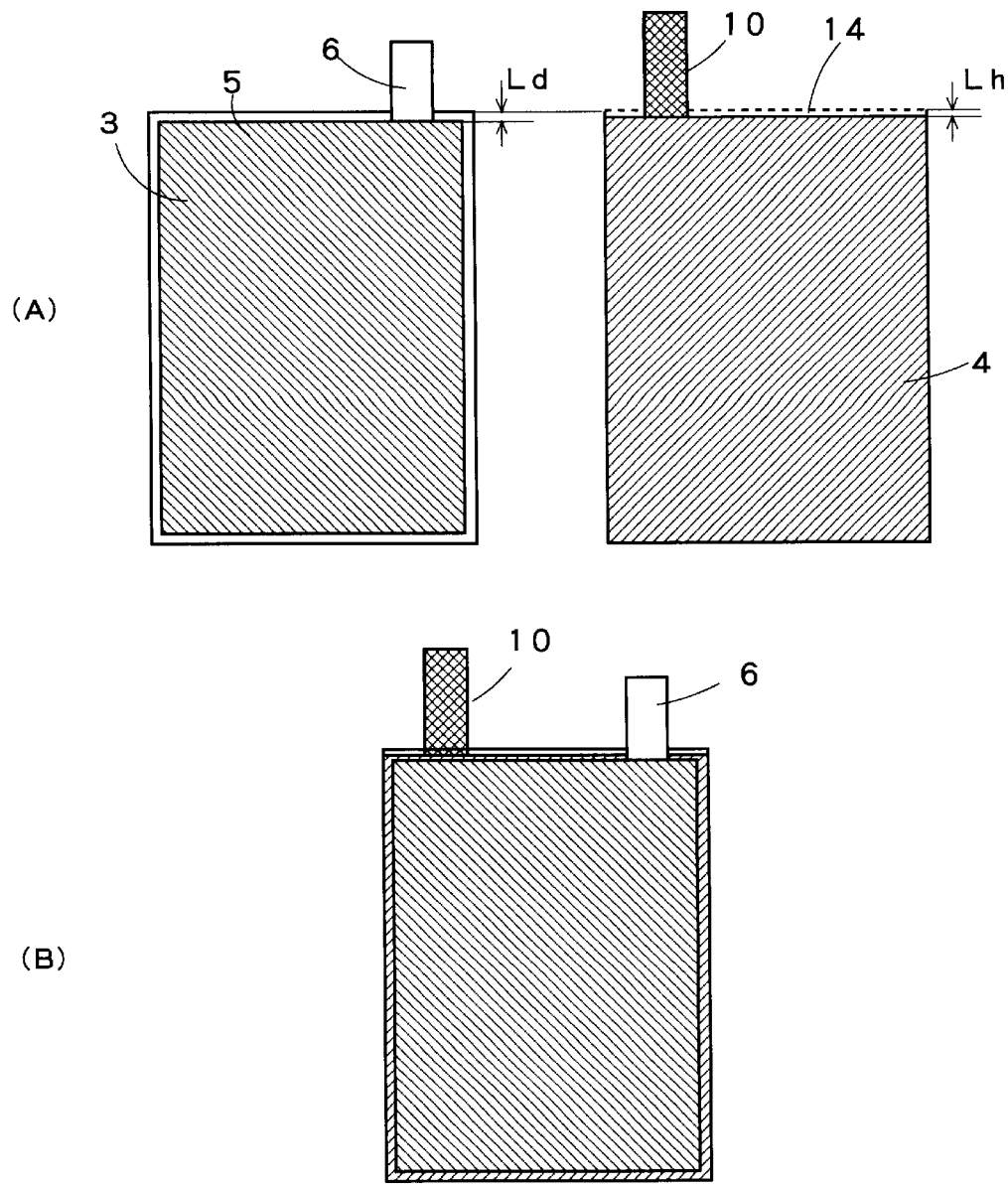
FIG. 5 represents drawings to explain still another embodiment of the present invention.

FIG. 5 represents drawings to explain yet still another embodiment of the present invention.

The positive electrode 3 covered with the separator 5 and the negative electrode 4 with the notched portion 14 formed on it as shown in FIG. 5(A) are arranged at face-to-face positions and laminated on each other as shown in Fig. 5(B).

On the negative electrode 4 positioned face-to-face to the positive electrode current collecting tab 6, the entire side facing to the positive electrode current collecting tab is notched or cut in lateral direction in a predetermined size.

Here, the parameters:

Lh: Length in longitudinal direction of the notched portion of the negative electrode Ld: Width of the separator positioned on outer periphery of the positive electrode satisfy the relation:

$$Lh < Ld$$

In the example shown in FIG. 5, the positive electrode current collecting tab 6 and the negative electrode current collecting tab 10 are arranged on the same end surface. However, it may be designed in such manner that the positive electrode current collecting tab and the negative electrode current collecting tab are directed in opposite directions, or that the positive electrode current collecting tab and the negative electrode current collecting tab are arranged on end surfaces, which cross each other at an angle of 90°.

Figure 6:
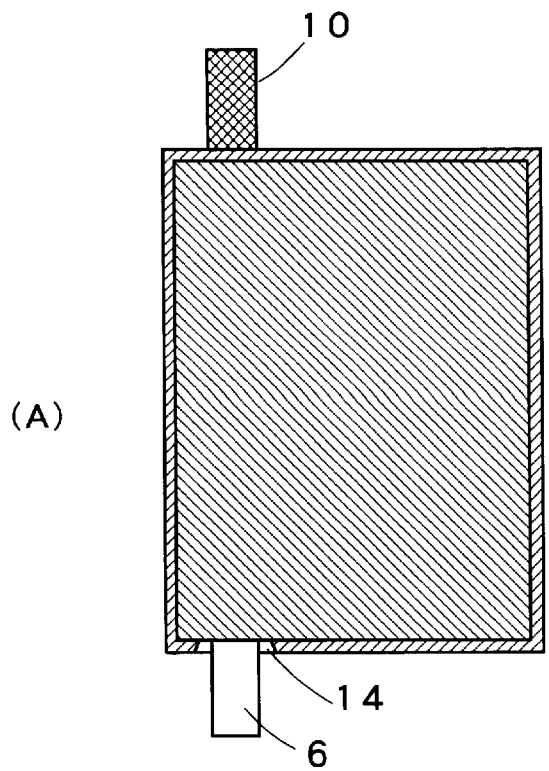
FIG. 6 represents drawings to explain still another embodiment of the present invention.
Figure 6:
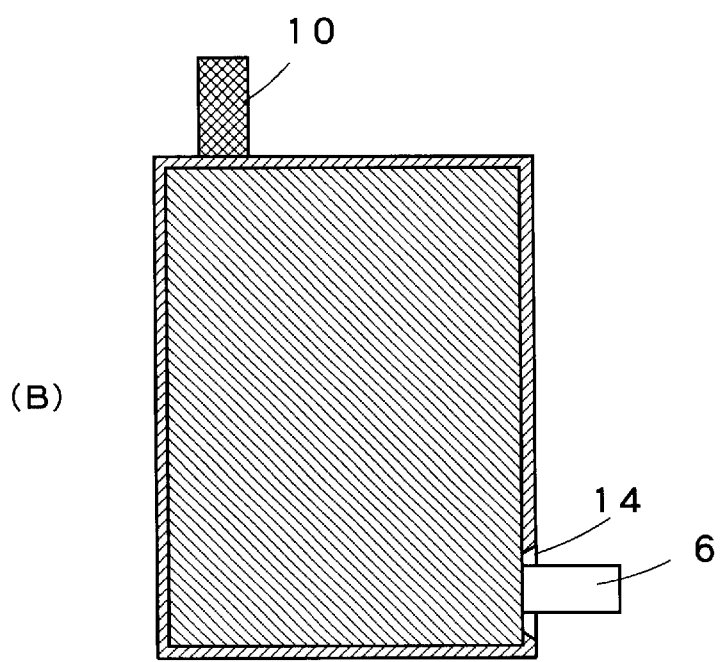

FIG. 6 represents drawings to explain still another embodiment of the present invention.

FIG. 6(A) is a drawing to show the positive electrode covered with the separator and the negative electrode laminated on each other. The positive electrode current collecting tab 6 and the negative electrode current collecting tab 1 are not provided on the same end surface, and the positive electrode current collecting tab 6 and the negative electrode current collecting tab 10 are directed in opposite directions. On the negative electrode facing to the positive electrode current collecting tab 6, a notched portion 14 is formed.

FIG. 6(B) is a drawing to explain an example where the positive electrode current collecting tab 6 and the negative electrode current collecting tab 10 are arranged on end surfaces, which cross each other at an angle of 90°. The positive electrode current collecting tab 6 is positioned face-to-face to the notched portion 14.

As described above, in the lamination type secondary battery according to the present invention, the current collecting tabs can be mounted at any point as desired depending on the intended purpose, place of installation, etc. of the battery. The number of the tabs is not limited to one, and a plurality of tabs may be provided.

Figure 7:
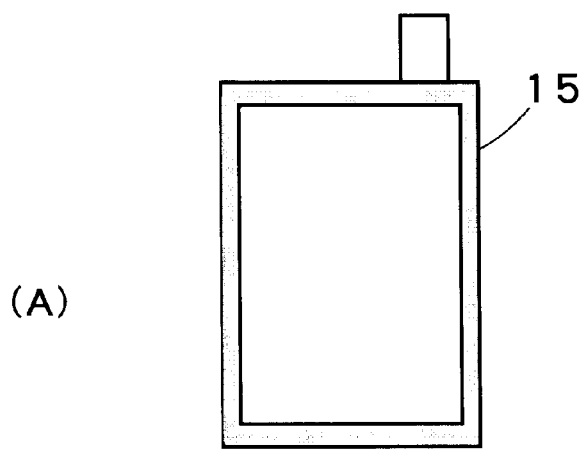
FIG. 7 represents drawings to explain an electrode covered with a separator according to the present invention.
Figure 7:
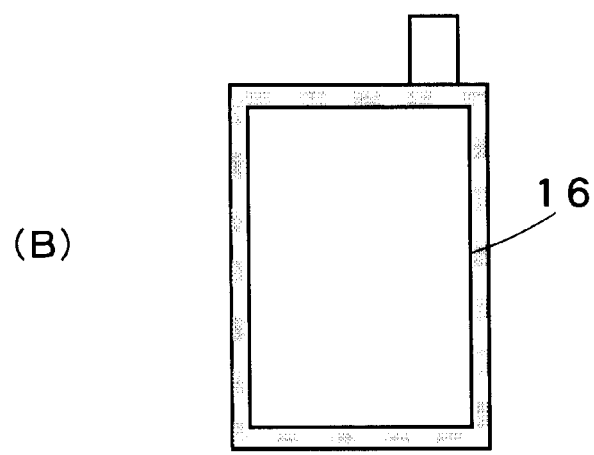
Figure 7:
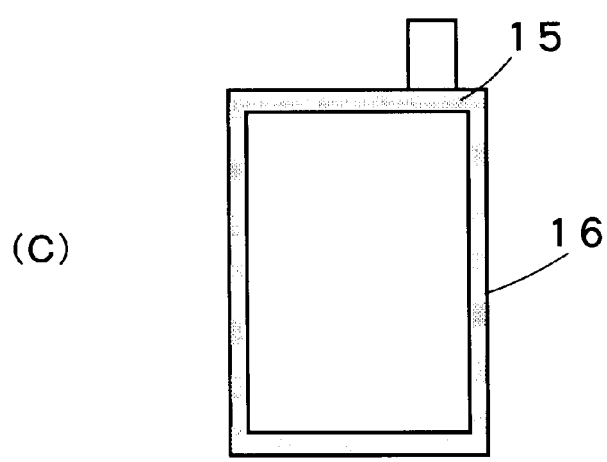

FIG. 7 represents drawings to explain the electrode covered with the separator in the present invention.

In FIG. 7(A), a thermally fused portion in linear shape is formed around the separator. In FIG. 7(B), the thermally fused portions 16 are provided intermittently. In FIG. 7(C), a thermally fused portion 15 in linear shape is provided on a part of the outer periphery, and the thermally fused portion 16 is arranged intermittently on the other portion.

These can be produced as follows: Two separators are arranged on both sides of the positive electrode respectively, and a predetermined portion is thermally fused.

When the thermally fused portion arranged intermittently is formed, wrinkling is not easily formed on the separator compared with the case where the thermally fused portions are arranged continuously in linear shape. Electrolytic solution is easily permeated from the portion not thermally fused.

On the other hand, on the thermally fused portion, opening on the separator is closed, and ion fluxes flowing through the thermally fused portion is reduced. Therefore, when the notched portion is provided on the opposing negative electrode, the thermally fused portion in continuously linear shape may be formed to reduce the ion fluxes on the part facing to the notched portion. By the use of both the thermally fused portion in linear shape and the thermally fused portion in intermittent arrangement, it is possible to adjust fluxes of ions on the periphery of the electrode.

In the above, description has been given on the electrode designed in rectangular shape, while the electrode of various shapes such as polygonal, circular, elliptical shape, etc. may be used depending on the installation place, the intended purpose, etc. of the battery.

Figure 8:
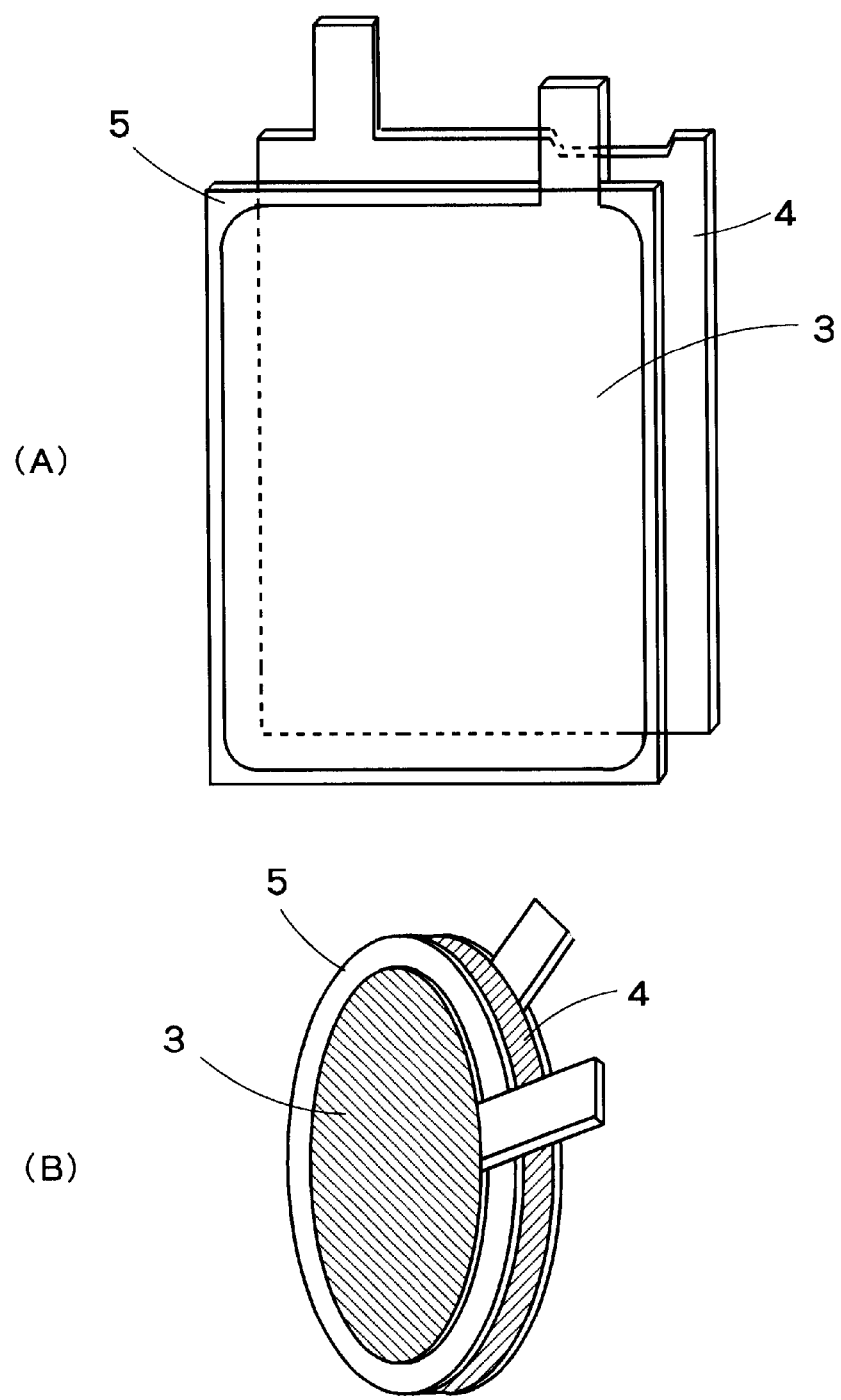
FIG. 8 represents drawings to explain yet still another embodiment of the present invention.

FIG. 8 shows perspective views of still another embodiment of the present invention. As shown in FIG. 8 (A), the positive electrode 3 covered with the separator 5 may have its four corners rounded. In this case, it is possible to prevent the damage of the separator 5 caused by the shock from corners of the positive electrode 3.

Also, as shown in FIG. 8(B), the electrode may be designed in disk-like shape. The positive electrode 3 in disk-like shape is covered with the separator 5, and the negative electrode 4 of the same size as outer periphery of the separator is positioned face-to-face to it, and this facilitates accurate positioning. When the electrode in disk-like shape is used, a lamination type battery in cylindrical shape can be manufactured.

The positive electrode current collecting tab and the negative electrode current collecting tab provided on the positive electrode and the negative electrode respectively in the lamination type secondary battery of the present invention can be manufactured by welding a material different from the material of the positive electrode and the negative electrode. By manufacturing the electrodes integrally with current collector of each electrode, surface area of the electrode contributing to battery reaction can be increased. Also, this makes it possible to eliminate welding process in the production of the current collecting tab.

Referring to the drawings, description will be given below on the case where the electrode is integrated with the current collecting tab.

Figure 9:
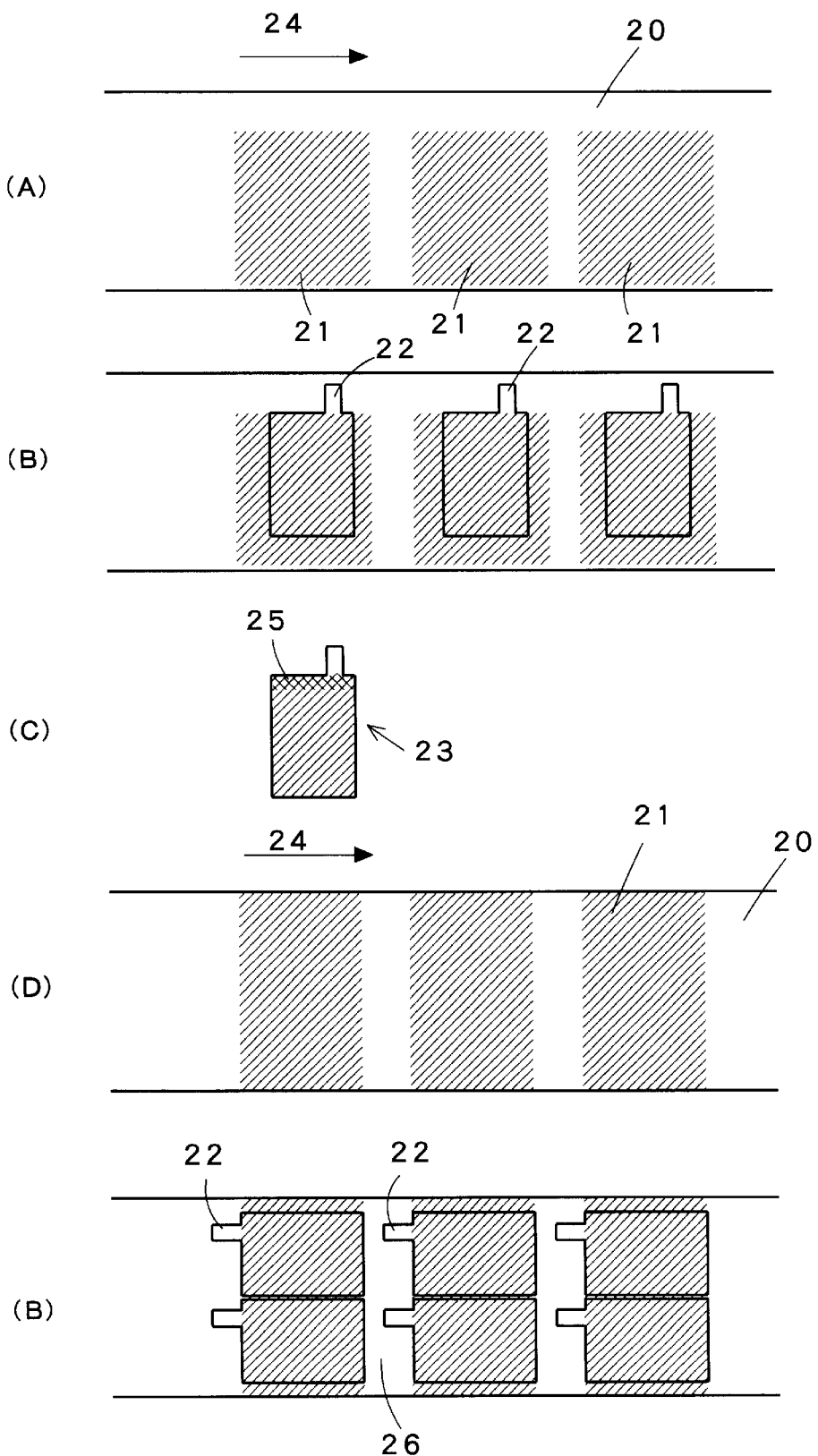
FIG. 9 represents drawings to explain a method for manufacturing electrodes of the lamination type secondary battery of the present invention.
Figure 10:
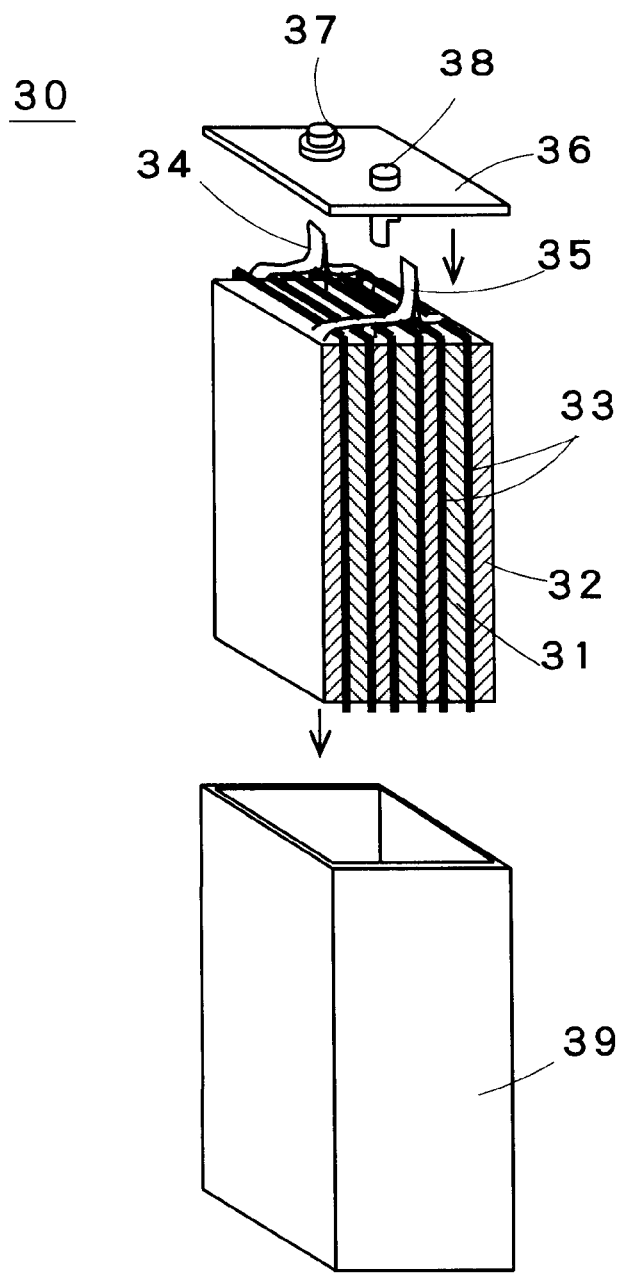
FIG. 10 is a perspective view to explain a conventional lamination type secondary battery.

FIG. 9 represents drawings to explain a process to manufacture the battery electrode.

As shown in FIG. 9(A), by moving a band-like metal foil 20 for producing the current collector, an electrode active material layer 21 is produced using an intermittent coating device. After the electrode active material layer is formed on one side, the active material layer is coated in similar manner on the opposite side.

Next, the battery active material layer is compressed by rolling, and a battery electrode 23 in any shape as desired can be manufactured so that a current collecting tab 22 is positioned on a non-coated portion as shown in FIG. 9(B).

However, when the bank-like metal foil for manufacturing the current collector is compressed by rolling in longitudinal direction, there will be the difference of elongation in rolling direction 24 between the portion where the active material layer is formed and the portion where the active material layer is not formed. As a result, distortion often occurs between the portion of the battery electrode where the battery active material layer is formed and the portion where it is not formed. For this reason, on an end 25 in lateral direction of the active material layer as shown in FIG. 9(B), a portion may be produced, which has features unfavorable for battery characteristics.

In contrast, the electrode active material layer 21 is formed on one side as shown in FIG. 9(C) and the active material layer is formed similarly on the other side. Then, the battery active material layer is compressed by rolling. Next, as shown in FIG. 9(D), by cutting the current collecting tab 22 of the battery from an active material non-coated portion 26 in longitudinal direction of the active material coated layer of the band-like battery foil, and a battery electrode with no distortion can be manufactured.

As a container for accommodating a power generating element of the lamination type secondary battery of the present invention, a battery case made of metal or made of flexible synthetic resin material may be used.

When a battery case made of metal is used, a plurality of the current collecting tabs of the same polarity are welded together by the method such as ultrasonic welding. Then, the tabs are welded to an electrode terminal mounted on a lid to close the battery case at a position inside the battery case. Then, the battery case is closed.

When the flexible external material is used, a plurality of the current collecting tabs with the same polarity are welded together by the method such as ultrasonic welding. Then, the current collecting tabs are directed outside, and it is sealed by thermal fusion of the flexible external material.

The lamination type secondary battery of the present invention can be applied to various types of batteries. In the following, description will be given on the lithium ion battery.

As the positive electrode active material, the following substances may be used: transition metal lithium composite oxide such as lithium cobaltate, lithium manganate, lithium nickelate, lithium cobaltate-nickelate, to which lithium ions can be doped and undoped, metal chalcogenide such as lithium titanium sulfide, lithium molybdenum sulfide, lithium niobium selenide, etc., organic compounds such as polypyrrole, polythiophene, polyanilin, polyacene compound, polyacetylene, polyallylenevinylene, dithiol derivative, disulfide derivative, etc., and mixture of these substances.

As the current collector of the positive electrode, aluminum or its alloy or metal such as titanium may be used.

As the negative electrode, carbonaceous material such as graphite, atypical carbon, etc., tin type composite oxide, to which lithium ions can be doped and undoped, may be used. As the negative electrode current collector, copper, nickel or alloy of these metals may be used.

As the separator to cover the positive electrode of the present invention, film of porous polyethylene, polypropylene, polyamide, etc. may be used.

Description will be given below on the present invention referring to an example.

EXAMPLE 1

A mixture comprising 92 weight parts of lithium manganate ($Li_{1+x}Mn_{2-x}O_4$) powder, 5 weight parts of carbon black, and 3 weight parts of vinylidene polyfluoride was coated on an aluminum foil and dried, and this was processed by rolling. Then, a positive electrode current collecting tab was integrally formed in size of 120 mm×65 mm×200 $\mu$m (length×width×thickness). On both surfaces of the positive electrode having the positive electrode current collecting tab of 10 mm in width, a separator made of micro-porous polypropylene in size of 125 mm×70 mm×30 $\mu$m (length×width×thickness) was placed, and the periphery was thermally fused, and a positive electrode covered with the separator was prepared.

A mixture comprising 91 weight parts of graphitized meso-carbon micro-beads (MCMB; Osaka Gas Co., Ltd.), 1 weight part of carbon black, and 8 weight parts of vinylidene polyfluoride was coated on a copper foil and was dried. After this was processed by rolling, a negative electrode in size of 125 mm×70 mm×200 $\mu$m (length×width×thickness) was integrally formed, and a negative electrode collecting tab of 10 mm in width was prepared. Next, a notched portion of 2.5 mm×15 mm (depth×width) was cut on the part of the electrode facing to the positive current collecting tab.

Next, the positive electrodes covered with the separator and the negative electrodes were aligned with each other using a jig with two end surfaces held in perpendicular direction. The negative electrodes were laminated in 31 layers and the positive electrodes were laminated in 30 layers. The current collecting tabs of the same polarity were brought together and bonded by ultrasonic welding. Then, the tabs were bonded to a positive electrode terminal and to a negative electrode terminal mounted on a lid, and the lid was welded together.

Next, an electrolytic solution was prepared by dissolving $LiPF_6$ into a mixed solvent, which contains 30 volume parts of ethylene carbonate and 70 volume parts of diethyl carbonate so that concentration of the solution will be 1.0 mol/liter. The electrolytic solution was injected through an injection port formed on the lid. Then, the injection port was sealed, and a lithium ion secondary battery was prepared.

One hundred pieces of batteries thus produced were charged with electricity, and battery characteristics were determined. Short-circuiting of the electrodes was found in none of the batteries.

In the lamination type secondary battery of the present invention, electrodes in planar shape comprising positive electrodes and negative being different in size are provided, each of the electrodes having smaller surface area is covered with a separator, and outer periphery of the separator is equalized in size with the opposing electrodes, and the electrodes are laminated on each other. As a result, accurate positioning of the electrodes can be performed, and this makes it possible to provide a battery with excellent characteristics. Also, a protective member integrated with the separator is arranged on the current collecting tab mounted on the electrode having smaller surface area and a notched portion is provided on the opposing electrode. As a result, a lamination type secondary battery can be provided, in which no short-circuiting occurs between the current collecting tab and the opposing electrode.

What is claimed is:

1. A lamination type secondary battery, comprising positive electrodes and negative electrodes having different surface areas, said positive electrodes and said negative electrodes being laminated face-to-face with a separator therebetween, each of the electrodes having smaller surface area is covered with a separator main body and arranged at the center and positioned with equal spacing from outer periphery of the separator main body, and outer periphery of the electrode having larger surface area has a size equal to the size of outer periphery of the separator main body to cover the electrode having smaller surface area.

2. A lamination type secondary battery according to claim 1, wherein a current collecting tab provided on the electrode having smaller surface area is covered with a protective member integrally formed with the separator main body.

3. A lamination type secondary battery according to claim 1, wherein, when the electrode having smaller surface area is projected perpendicularly to the electrode having larger surface area, the entire portion of the projected area is within the electrode having larger surface area.

4. A lamination type secondary battery according to claim 2, wherein when the electrode having smaller surface area is projected perpendicularly to the electrode having larger surface area, the entire portion of the projected area is within the electrode having larger surface area.

5. A lamination type secondary battery according to claim 1, wherein, when the electrode having smaller surface area is projected perpendicularly to the opposing electrode having large surface area, an area outside the projected portion is positioned face-to-face to the current collecting tab mounted on the electrode having smaller surface area and is provided with a notched portion larger than the width of the current collecting tab.

6. A lamination type secondary battery according to claim 2, wherein, when the electrode having smaller surface area is projected perpendicularly to the opposing electrode having large surface area, an area outside the projected portion is positioned face-to-face to the current collecting tab mounted on the electrode having smaller surface area and is provided with a notched portion larger than the width of the current collecting tab.

7. A lamination type secondary battery according to claim 3, wherein, when the electrode having smaller surface area is projected perpendicularly to the opposing electrode having large surface area, an area outside the projected portion is positioned face-to-face to the current collecting tab mounted on the electrode having smaller surface area and is provided with a notched portion larger than the width of the current collecting tab.

8. A lamination type secondary battery according to claim 4, wherein, when the electrode having smaller surface area is projected perpendicularly to the opposing electrode having large surface area, an area outside the projected portion is positioned face-to-face to the current collecting tab mounted on the electrode having smaller surface area and is provided with a notched portion larger than the width of the current collecting tab.

9. A lamination type secondary battery according to claim 1, wherein at least a part of the separator positioned in an area outside the electrode having smaller surface area is thermally fused.

10. A lamination type secondary battery according to claim 2, wherein at least a part of the separator positioned in an area outside the electrode having smaller surface area is thermally fused.

11. A lamination type secondary battery according to claim 3, wherein at least a part of the separator positioned in an area outside the electrode having smaller surface area is thermally fused.

12. A lamination type secondary battery according to claim 4, wherein at least a part of the separator positioned in an area outside the electrode having smaller surface area is thermally fused.

13. A lamination type secondary battery according to claim 5, wherein at least a part of the separator positioned in an area outside the electrode having smaller surface area is thermally fused.

14. A lamination type secondary battery according to claim 6, wherein at least a part of the separator positioned in an area outside the electrode having smaller surface area is thermally fused.

15. A lamination type secondary battery according to claim 7, wherein at least a part of the separator positioned in an area outside the electrode having smaller surface area is thermally fused.

16. A lamination type secondary battery according to claim 8, wherein at least a part of the separator positioned in an area outside the electrode having smaller surface area is thermally fused.

17. A lamination type secondary battery according to one of claims 1 to 16, wherein the electrode having smaller surface area is designed in polygonal shape, and each corner of the electrode is rounded.

18. A lamination type secondary battery according to one of claims 1 to 16, wherein external form of the electrode is designed with curved surface.

* * * * *

UNITED STATES PATENT AND TRADEMARK OFFICE
CERTIFICATE OF CORRECTION

PATENT NO. : 6,692,866 B2
DATED : February 17, 2004
INVENTOR(S) : Hideto Watanabe et al.

It is certified that error appears in the above-identified patent and that said Letters Patent is hereby corrected as shown below:

<u>Title page,</u>
Item [73], Assignee, correct "NEC Mobile Energy Corporation" into
-- NEC TOKIN TOCHIGI, LTD. --.

Signed and Sealed this

Thirteenth Day of December, 2005

JON W. DUDAS
*Director of the United States Patent and Trademark Office*